United States Patent
Ichiraku et al.

(10) Patent No.: US 11,803,270 B2
(45) Date of Patent: Oct. 31, 2023

(54) TOUCH PANEL AND DRIVING METHOD FOR TOUCH PANEL

(71) Applicant: Shanghai Tianma Micro-Electronics Co., Ltd., Shanghai (CN)

(72) Inventors: Tsuyoshi Ichiraku, Kanagawa (JP); Yukihiro Ito, Kanagawa (JP); Hitoshi Hiratsuka, Kanagawa (JP)

(73) Assignee: Shanghai Tianma Micro-Electronics Co., Ltd., Shanghai (CN)

( * ) Notice: Subject to any disclaimer, the term of this patent is extended or adjusted under 35 U.S.C. 154(b) by 0 days.

(21) Appl. No.: 17/738,692

(22) Filed: May 6, 2022

(65) Prior Publication Data

US 2022/0365650 A1 Nov. 17, 2022

(30) Foreign Application Priority Data

May 11, 2021 (JP) ................................ 2021-080233

(51) Int. Cl.
*G06F 3/041* (2006.01)
*G06F 3/044* (2006.01)

(52) U.S. Cl.
CPC ........ *G06F 3/04164* (2019.05); *G06F 3/0446* (2019.05); *G06F 3/04182* (2019.05)

(58) Field of Classification Search
None
See application file for complete search history.

(56) References Cited

U.S. PATENT DOCUMENTS

| | | | |
|---|---|---|---|
| 10,572,055 B2 | 2/2020 | Shin | |
| 2011/0279408 A1* | 11/2011 | Urano | G06F 3/0446 345/173 |
| 2014/0184543 A1* | 7/2014 | Kim | G06F 3/0412 345/173 |
| 2014/0184943 A1* | 7/2014 | Yang | G06F 3/0445 349/12 |
| 2017/0185184 A1* | 6/2017 | Kim | G06F 3/04166 |
| 2019/0235663 A1 | 8/2019 | Xuan et al. | |
| 2020/0033989 A1 | 1/2020 | Park et al. | |

FOREIGN PATENT DOCUMENTS

JP 6501750 B2 4/2019

OTHER PUBLICATIONS

Jaehun Jun, et al., "43 Inch UHD Digital Kiosk System Using Advanced In-cell Touch Technology" SID 2018, May 30, 2018, pp. 914-917.

\* cited by examiner

*Primary Examiner* — Krishna P Neupane
(74) *Attorney, Agent, or Firm* — Sughrue Mion, PLLC

(57) ABSTRACT

A touch panel includes arranged touch electrodes, and a driver IC connected to each of the touch electrodes. The plurality of touch electrodes is grouped into a plurality of groups such that electrodes belonging to different groups are included in a range smaller than an object to be detected, such as a finger. The driver IC alternately or sequentially applies a driving voltage to the touch electrodes of the plurality of groups, detects a capacitance of each of the sensor electrodes, and detects, based on the detected capacitance, whether there is a touch.

11 Claims, 17 Drawing Sheets

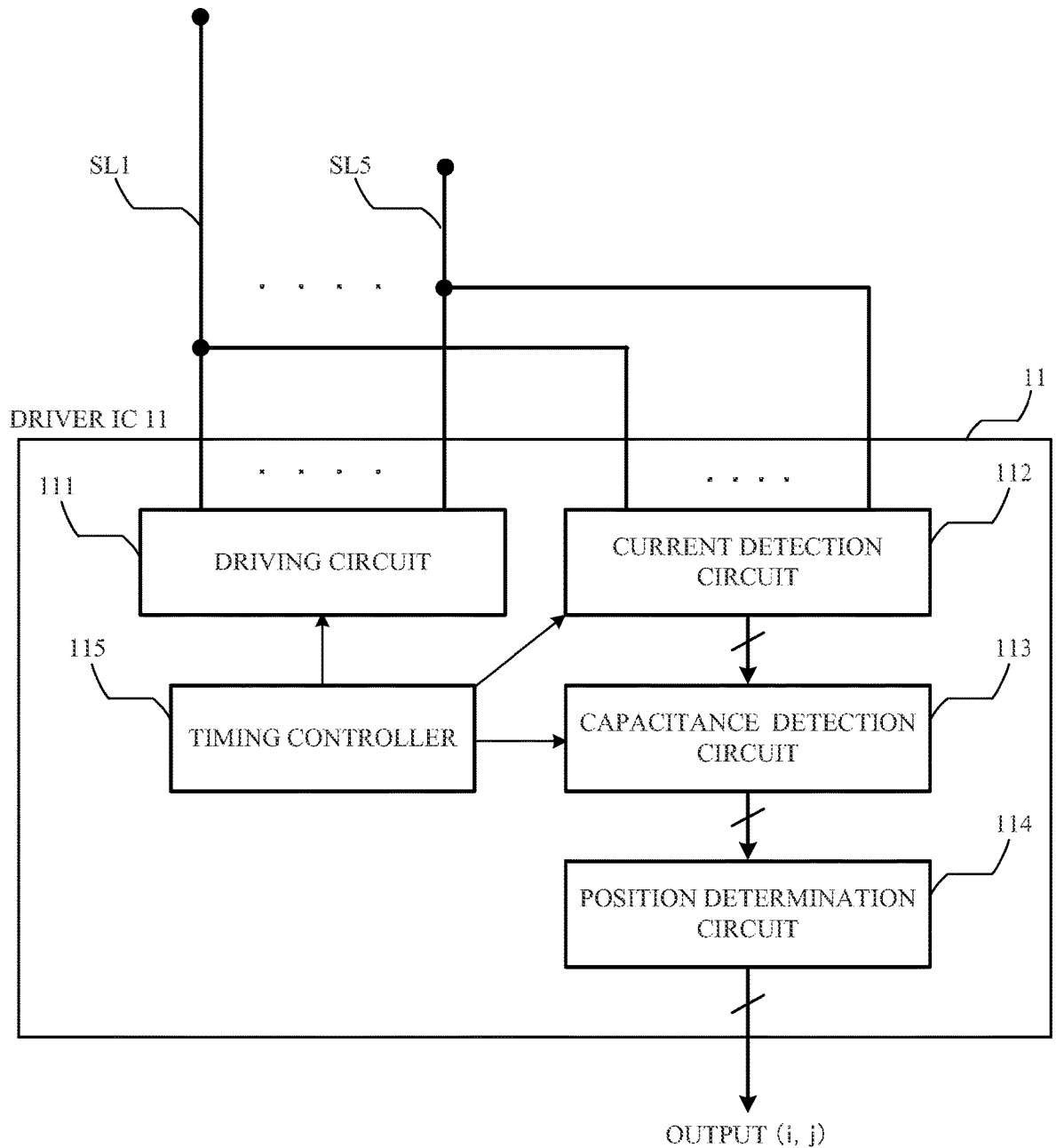

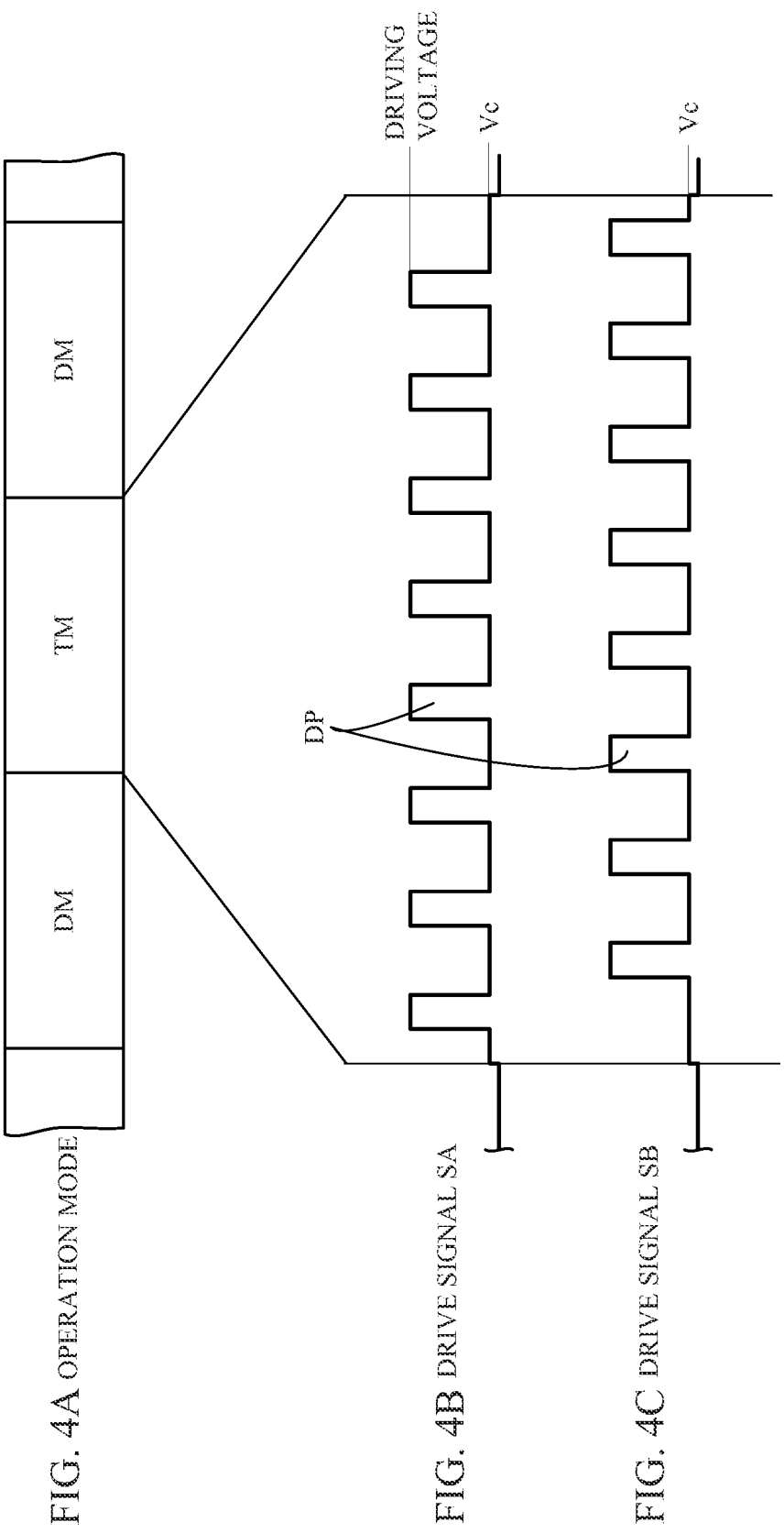

TOUCH PANEL AND DRIVING METHOD FOR TOUCH PANEL

CROSS-REFERENCE TO RELATED APPLICATION

This application claims the benefit of Japanese Patent Application No. 2021-80233, filed on May 11, 2021, the entire disclosure of which is incorporated by reference herein.

FIELD

The present disclosure relates generally to a touch panel and a driving method for the touch panel.

BACKGROUND

In touch panels, drive signals are applied to touch electrodes in order to sense touches. The drive signals consist of pulse signals with a predetermined frequency, and are a cause of electromagnetic interference (EMI). As electronic devices, touch panels must maintain EMI at a certain level or lower.

In general, the causes of electromagnetic interference (EMI) from digital circuits are: 1) spike currents that flow through the signal lines in response to low/high transitions of the digital signals; 2) penetration currents that flow in the IC circuit when outputting the digital signals from the IC circuit; 3) the decoupling capacitors of the IC circuit not sufficiently working; 4) common mode currents caused by a vulnerability of the signal ground (GND) of the device on which the IC circuit is mounted; and the like.

Touch panels output pulse signals from a driver IC to touch panel electrodes to carry out touch detection. Accordingly, spike current caused by the pulse signals flows through the lines connecting the driver IC and the touch panel electrodes and, consequently, the drive signals and the signal lines of the touch panel may become causes of electromagnetic interference (EMI). In a display device, the touch panel is arranged on the display surface side and, due to this, when an electromagnetic shield or the like is arranged on the touch panel to prevent electromagnetic interference (EMI), there are problems in that touch detection accuracy decreases and, also, display visibility is negatively affected. Additionally, in order to arrange filter elements such as filter beads for the pulse signals of the various lines, a large number of filter elements is required. Arranging such filter elements in a limited space is difficult and, moreover, may affect the touch detection accuracy. Therefore, there is a need for a countermeasure different from an electromagnetic shield or filter elements to prevent electromagnetic interference (EMI) from the touch panel.

Driving methods that include switching the driving frequency have been proposed as measures for reducing radiated electromagnetic noise caused by the operations of a touch panel. For example, the touch display device described in Japanese Patent No. 6501750 includes a display mode for displaying an image and a touch mode for detecting a touch position. This driving method divides a touch mode period into a plurality of unit touch periods. This driving method, in each unit touch period, changes the frequency of a touch drive signal from the frequencies of the driving signal in the other unit touch periods and drives electrodes, and, when the touch drive signal is output to any one electrode, applies a no-load drive signal to all of the other electrodes.

The touch display device described in US Patent Application Publication No. 2019/0235663 includes a plurality of display periods within one frame, switches a display region in each display period and displays, and detects a touch in a non-display region.

Additionally, "43 inch UHD Digital Kiosk System Using Advanced In-cell Touch Technology", SID 2018, 30 May 2018, Jaehun Jun, Yongwoo Choi, Hongju Lee, Hyeongwon Kang, Myungho Shin, Juneyoun Hwang, Hyunkyu Park, Kyungjin Jang, Jongsang Baek discloses, in the blank period of the display device, selecting driven electrodes using a multiplexer and sequentially scanning, and applying in-phase pulse signals to non-driven electrodes, data lines, and gate lines.

In a detection method described in Japanese Patent No. 6501750, while the noise level at the peak frequency may decrease, but the noise levels at the other frequency bands increase. Additionally, since the frequency of the drive signal must be switched to a lower frequency than the maximum driving frequency that can be touch detected, the number of driving voltages that can be applied in the limited display blank period may be reduced, and the touch detection accuracy may decrease.

In the detection method described in US Patent Application Publication No. 2019/0235663, the display is divided and must be controlled by display region. Consequently, the scale of the circuitry increases. Moreover, since the non-display region serves as a touch detection region, the timing for touch detection differs by display region and responsiveness differs by region.

The driving method disclosed in "43 inch UHD Digital Kiosk System Using Advanced In-cell Touch Technology", SID 2018 is a method for reducing the effects of parasitic capacitance, and does not take electromagnetic noise into consideration. Additionally, the non-sensing lines and electrodes are driven in-phase with the sensing lines and electrodes. Consequently, the radiated electromagnetic noise increases.

SUMMARY

A touch panel according to the present disclosure includes:
arranged sensor electrodes; and
a driver circuit connected to each of the sensor electrodes, wherein
the sensor electrodes are grouped into a plurality of groups such that electrodes belonging to different groups are included in a range smaller than an object to be detected, and
the driver circuit alternately or sequentially applies a driving voltage to the sensor electrodes of the plurality of groups, detects a capacitance of each of the sensor electrodes, and detects, based on the detected capacitance, whether there is a touch.

A driving method for a touch panel of the present disclosure is a method for driving a touch panel that includes arranged sensor electrodes, the driving method including:
grouping the sensor electrodes into a plurality of groups such that electrodes belonging to different groups are included in a range smaller than an object to be detected, and
applying a driving voltage to the sensor electrodes in a group order, detecting a capacitance of each of the sensor electrodes, and detecting, based on the detected capacitance, whether there is a touch.

It is to be understood that both the foregoing general description and the following detailed description are exemplary and explanatory and are not restrictive of this disclosure.

BRIEF DESCRIPTION OF THE DRAWINGS

A more complete understanding of this application can be obtained when the following detailed description is considered in conjunction with the following drawings, in which:

FIG. 3 is a configuration drawing of a driver IC illustrated in FIG. 1;

FIGS. 4A to 4C are timing charts explaining operations of the touch display device illustrated in FIGS. 1 and 2;

DETAILED DESCRIPTION

Hereinafter, a touch panel and a driving method for the touch panel according to various embodiments are described while referencing the drawings.

Embodiment 1

A touch panel and a driving method for the touch panel according to Embodiment 1 are described while referencing FIGS. 1 to 5B.

Figure 1:
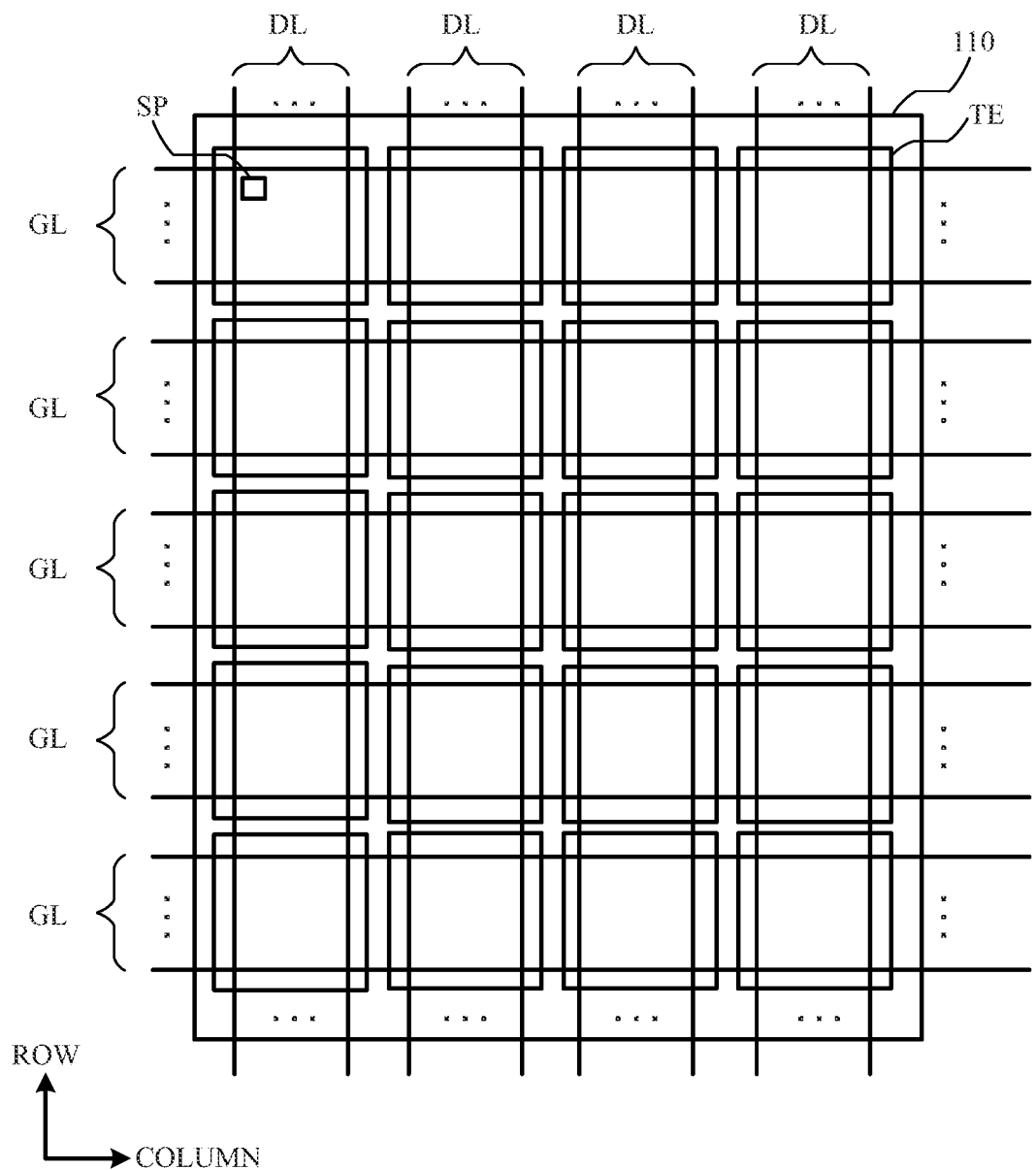
FIG. 1 is a schematic configuration drawing of a touch display device according to Embodiment 1.

Firstly, the configuration of a touch display device 100 according to the embodiment is described while referencing FIG. 1.

FIG. 1 is a schematic system configuration drawing of the touch display device 100. As illustrated in FIG. 1, the touch display device 100 includes a display panel 110 on which a plurality of data lines DL to which data voltage corresponding to a video signal is applied and a plurality of gate lines GL to which a gate signal is applied are arranged, the display panel 110 including a plurality of subpixels (subpixel electrodes) SP arranged in the vicinity of crossing positions of the data lines DL and the gate lines GL. The data lines DL are connected to the subpixels SP via source/drain paths of non-illustrated thin film transistors (TFT). A non-illustrated data driving circuit is connected to each of the data lines DL. Each of the gate lines GL is connected to the gates of the plurality of TFTs of the same column and to a non-illustrated gate driving circuit. The data driving circuit applies, to each of the data lines DL, data voltage that defines a display image of a row to be written. The data voltage is applied to the subpixels SP via the TFTs of that row. The gate driving circuit sequentially applies, to each of the gate lines GL, a gate signal for turning ON the TFTs connected to the subpixels SP to which the data voltage is to be written.

Touch electrodes TE are arranged in a matrix on substantially the entire surface of a touch detection region of the display panel 110. The touch electrodes TE are for detecting a contact (touch) of a user or the approach of a part of the body of the user. The touch electrodes TE are an example of the sensor electrodes for detecting a contact or an approach of an object to be detected.

Figure 2:
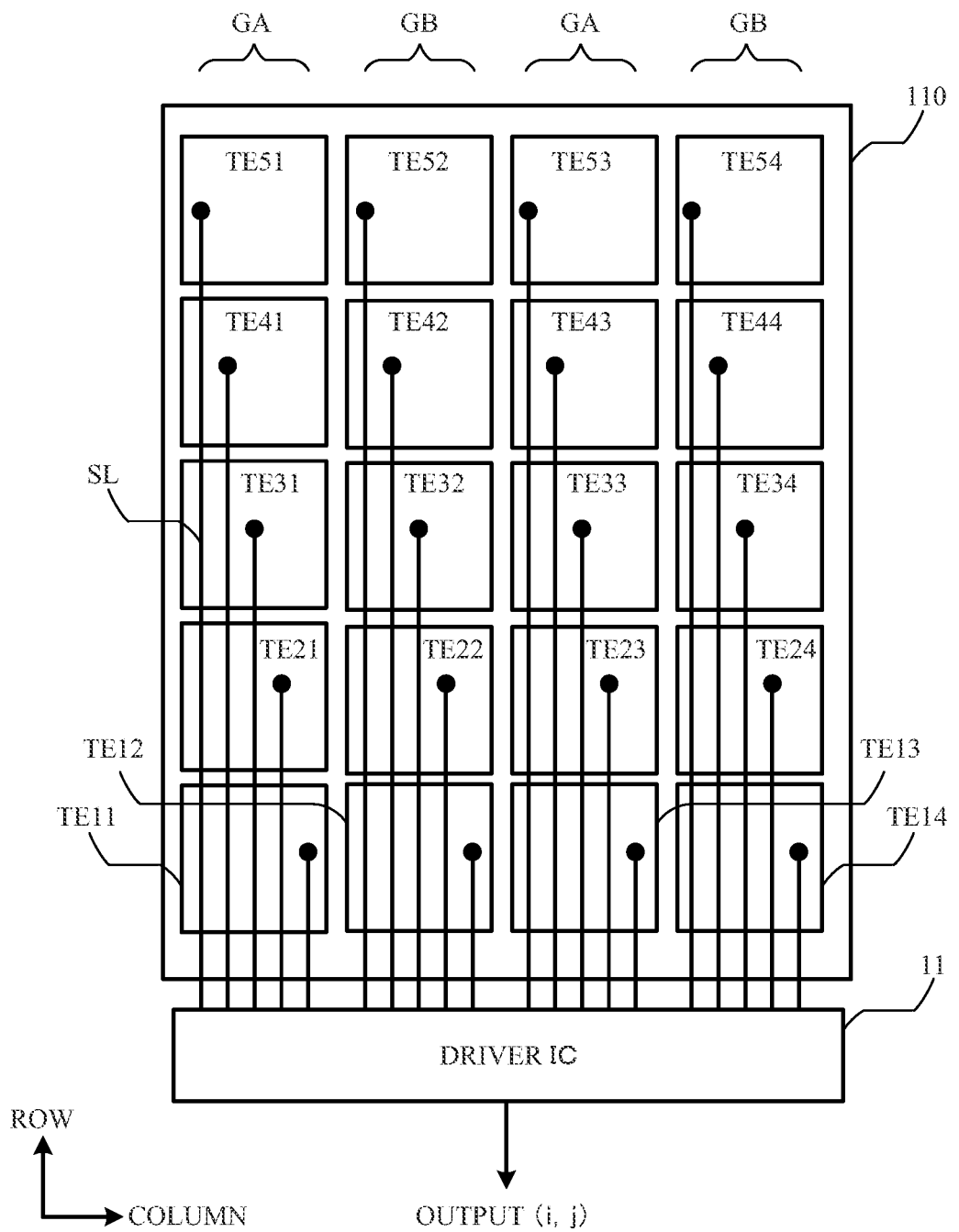
FIG. 2 is a configuration drawing of a touch detector of the touch display device illustrated in FIG. 1.

FIG. 2 illustrates the configuration of a touch detector 120 of the touch display device 100. Here, to facilitate comprehension, an example is illustrated in which the touch electrodes TE are arranged in five rows and four columns. To make it easy to distinguish between the touch electrodes TE, the touch electrode of the $i^{th}$ row and the $j^{th}$ column is marked with the reference symbol TEij. The touch electrodes TEij are grouped in a repeating pattern of single units. Specifically, the touch electrodes TE are divided into two groups by column units, namely A group GA of the first and third columns, and B group GB of the second and fourth columns. Each touch electrode TEij is connected to a driver integrated circuit (IC) 11 via a drive signal line SL. The touch electrodes TE are arranged such that sensor electrodes belonging to different groups exist within the size of the object to be detected. In the present embodiment, the object to be detected is assumed to be a finger of an adult, and the size of the object to be detected is assumed to be 5 mm×5 mm. In this case, each of the touch electrodes TE is configured from a rectangular transparent electrode having a length/width of 1 to 5 mm so that touch electrodes TE belonging to the two groups are arranged within the 5 mm×5 mm size.

The driver IC 11 is a driver circuit for detecting whether there is a touch and for detecting a touch position. The driver IC 11 is connected individually to each of the touch electrodes TEij via the drive signal line SL.

When detecting the touch position, firstly, the driver IC 11 applies a positive drive pulse in parallel to the touch electrodes TE of the A group GA, and applies a reference voltage Vc to the touch electrodes TE of the B group GB. The low voltage of the drive pulse is the reference voltage Vc, and the high voltage (driving voltage) is set to voltage that enables the detection of the approach of the object to be detected. However, the value of the driving voltage is not limited. In one example, the reference voltage Vc is DC fixed voltage such as ground voltage, power supply voltage, or the like. However, provided that the touch electrodes TE can be prevented from being in a floating state and the radiated electromagnetic noise can be suppressed, any voltage may be used. Note that, in cases in which the driver IC 11 is a sensor circuit that detects rises and falls of the drive pulse, by setting the reference voltage Vc to an intermediate value between the high voltage and the low voltage of the drive pulse, effects from the electrodes of the other group can be equalized at the times of rising and falling, and detection accuracy can be optimized.

When a finger of a human being approaches the touch electrodes TE, parasitic capacitance is simultaneously formed between the finger and one or a plurality of the touch electrodes TE of the A group GA that is being approached, and between the finger and one or a plurality of the touch electrodes TE of the B group GB that is being approached. When the potential of the finger is stable, current flows transiently, via the parasitic capacitance, between the finger and the driven touch electrodes TE of the A group GA. Meanwhile, when the potential of the finger is unstable, current flows transiently, via the parasitic capacitance and the finger, from the touch electrodes TE of the driven A group GA to the non-driven touch electrodes TE of the B group GB. The driver IC 11 monitors the current flowing through each driven drive signal line SL, or the like, to detect the parasitic capacitance of each driven touch electrode TE. In one example, the driver IC 11 determines whether there is an approaching finger on the basis of whether the detected parasitic capacitance is greater than a reference value and, when a determination is made that there is an approaching finger, identifies a coordinate position (i, j) of the finger from the distribution of parasitic capacitance.

At a next detection timing, the driver IC 11 applies a positive drive pulse in parallel to the touch electrodes TE of the B group GB, and applies the reference voltage Vc to the touch electrodes TE of the A group GA. The driver IC 11 monitors the current flowing through each drive signal line SL and detects the distribution of the parasitic capacitance of each driven touch electrode TE. At this time as well, in one example, the driver IC 11 determines whether there is an approaching finger on the basis of whether the detected parasitic capacitance is greater than the reference value and, when a determination is made that there is an approaching finger, identifies the coordinate position (i, j) of the finger from the distribution of parasitic capacitance.

Thereafter, the driver IC 11 carries out the same operations. Specifically, the driver IC 11 repeats the operation of i) applying the positive drive pulse to the touch electrodes TE of the A group GA and applying the reference voltage Vc to the touch electrodes TE of the B group GB, detecting the parasitic capacitance of each touch electrode TE of the A group GA by monitoring the current flowing through each drive signal line SL, determining whether there is a finger in the vicinity of the touch electrodes TE of the A group GA by comparing the parasitic capacitance of each touch electrode TE with the reference value, and identifying the coordinate position (i, j) of the finger from the distribution of parasitic capacitance; and the operation of ii) applying the positive drive pulse to the touch electrodes TE of the B group GB and applying the reference voltage Vc to the touch electrodes TE of the A group GA, detecting the parasitic capacitance of each touch electrode TE of the B group GB by monitoring the current flowing through each drive signal line SL, determining whether there is a finger in the vicinity of the touch electrodes TE of the B group GB by comparing the parasitic capacitance of each touch electrode TE with the reference value, and identifying the coordinate position (i, j) of the finger from the distribution of parasitic capacitance. At the end of a touch detection mode or the like, the driver IC 11 identifies, in a matrix of the touch electrodes TE, the coordinate position (i, j) of the finger on the basis of the plurality of detected distributions from when driving the A group GA and the plurality of detected distributions from when driving the B group GB, and outputs the coordinate position (i, J) to a host device.

As illustrated in FIG. 3, the driver IC 11 includes a driving circuit 111, a current detection circuit 112, a capacitance detection circuit 113, a position determination circuit 114, and a timing controller 115.

The driving circuit 111 applies, via the drive signal lines SL, a drive signal SA illustrated in FIG. 4B to the touch electrodes TE of the A group GA, and applies a drive signal SB illustrated in FIG. 4C to the touch electrodes TE of the B group GB.

The current detection circuit 112 detects the current flowing through each drive signal line SL.

The capacitance detection circuit 113 detects the corresponding capacitance on the basis of the current detected by the current detection circuit 112.

The position determination circuit 114 identifies, on the basis of the distribution of the detected capacitance, the coordinate position (i, j) of the touch electrode TE that is touched or approached, and outputs the coordinate position (i, j) to the host device. The timing controller 115 supplies a timing control signal that controls the operation timings of the driving circuit 111, the current detection circuit 112, and the capacitance detection circuit 113.

Next, the operations of the touch display device 100 that is provided with the configuration described above are described.

As illustrated in FIG. 4A, the touch display device 100 repeats, in an alternating manner, a display mode DM that displays an image and a touch detection mode TM that detects the touch position (including an approach position).

In the display mode DM, a non-illustrated gate driver sequentially applies a gate pulse to the gate lines GL, and sequentially turns ON the TFTs of each row. A data driver applies, to the data lines DL, a data voltage instructing a gradation of each subpixel SP of the row to which the gate pulse is applied by the gate driver. As a result, the gradation of each subpixel SP is set, and that gradation is maintained for a one frame period. An image is displayed by repeating such an operation for all of the subpixels SP.

When the operating mode transitions from the display mode DM to the touch detection mode TM, the driver IC 11 starts a touch detection operation.

Firstly, as illustrated in FIG. 2, the driver IC 11 groups the touch electrodes TE into the A group GA and the B group GB. However, at this stage, it is not necessary to newly group the touch electrodes TE. For example, when groups are set at the design stage of the driver IC 11, it is sufficient to proceed with the processing. In the present disclosure, the concept of "grouping" includes such cases.

In accordance with control by the timing controller 115, the driving circuit 111 of the driver IC 11 applies the drive signal SA illustrated in FIG. 4B to the touch electrodes TE of the A group GA, and the drive signal SB illustrated in FIG. 4C to the touch electrodes TE of the B group GB. The drive signals SA and SB are signals configured from a series of positive drive pulses DP having phases that are offset from each other by approximately it. A pulse width of each drive pulse is, for example, from 3 to 7 μs and, in this example, is 5 μs. In this case, a pulse period is, for example, 15 μs, which is three-times the pulse width. Additionally, in accordance with control by the timing controller 115, the current detection circuit 112 of the driver IC 11 detects the current flowing through each drive signal line SL, that is, detects the current flowing through each touch electrode TE.

Figure 5A:
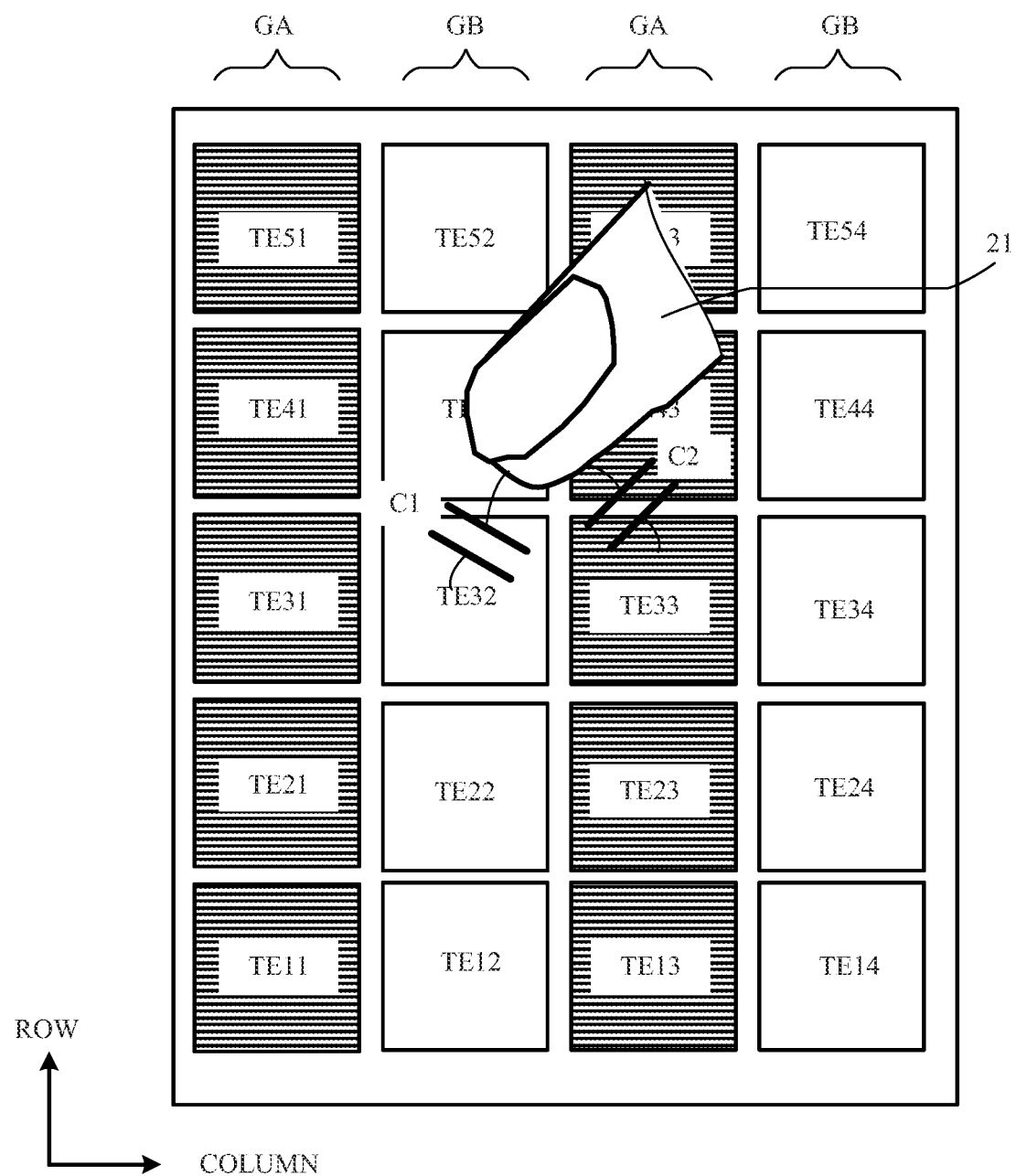
FIGS. 5A and 5B are drawings explaining states in which there is a touch of the touch detector illustrated in FIG. 2.
Figure 5B:
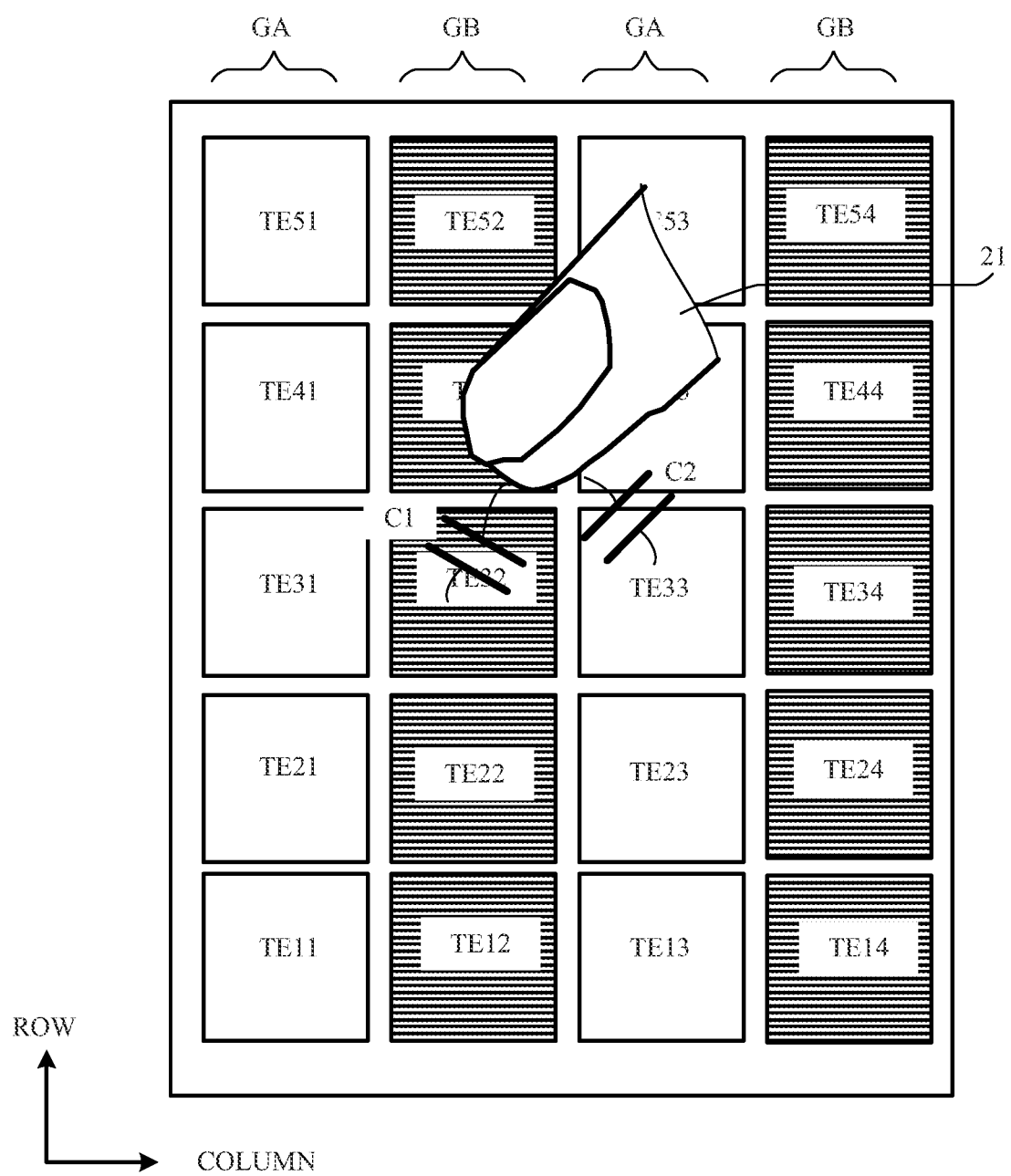

As illustrated in FIGS. 5A and 5B, an assumption is made that a finger 21 is approaching a position above and between the touch electrode TE32 and the touch electrode TE33. In this case, parasitic capacitance is formed between the finger 21 and the proximate touch electrodes TE. The magnitude of the parasitic capacitance changes depending on the distance between the finger 21 and each touch electrode TE. In FIGS. 5A and 5B, to facilitate comprehension, a parasitic capacitance C1 between the touch electrode TE32 and the finger 21, and a parasitic capacitance C2 between the touch electrode TE33 and the finger 21 are illustrated. Additionally, the touch electrodes TE to which the drive pulse DP is applied are illustrated marked by hatching.

In accordance with control by the timing controller 115, the driving circuit 111 of the driver IC 11 applies the drive pulse DP of the drive signal SA to the A group GA, that is, to the touch electrodes TE of the first and third columns, and applies the reference voltage Vc of the drive signal SB to the touch electrodes TE of the B group GB, that is, to the second and fourth columns. Then, when the finger 21 of the human is approaching the touch electrodes TE, current flows transiently through the touch electrode TE33 and the surrounding touch electrodes TE via the parasitic capacitance C2 and the human body or the parasitic capacitance C2, the finger 21, and the parasitic capacitance C1. In accordance with control by the timing controller 115, the current detection circuit 112 of the driver IC 11 detects the current flowing through each drive signal line SL. The capacitance detection circuit 113 obtains the distribution of parasitic capacitance from the distribution of the current. The position determination circuit 114 obtains, from the obtained distribution of capacitance, the position coordinates (i, j) of the finger, and outputs the position coordinates (i, j).

Next, in accordance with control by the timing controller 115, as illustrated in FIGS. 4C and 5B, the driving circuit 111 of the driver IC 11 applies the drive pulse DP of the drive signal SB to the B group GB, that is, to the touch electrodes TE of the second and fourth columns, and applies the reference voltage Vc of the drive signal SB to the A group GA, that is, to the touch electrodes TE of the first and third columns. Then, when the finger 21 of the human is approaching the touch electrodes TE, current flows transiently through the touch electrode TE32 and the surrounding touch electrodes TE via the parasitic capacitance C1 and the human body or the parasitic capacitance C1, the finger 21, and the parasitic capacitance C2. In accordance with control by the timing controller 115, the current detection circuit 112 of the driver IC 11 detects the current flowing through each drive signal line SL. The capacitance detection circuit 113 obtains the distribution of the parasitic capacitance from the distribution of the current. The position determination circuit 114 obtains the obtained distribution of the capacitance, obtains the position coordinates (i, j) of the finger from the obtained distribution of the capacitance, and outputs the position coordinates (i, j).

The driver IC 11 repeats the same operations a number of times and, when the driver 11 can determine that there are no false detections caused by external noise or the like, outputs, to the host device, the position coordinates (i, j) ultimately calculated from the detected coordinates from when driving the A group GA and the detected coordinates from when driving the B group GB. Any calculation method can be used. Examples thereof include using the average and using the majority.

Thereafter, the operating mode transitions to the display mode DM. During the display mode DM period, the driver IC 11 does not perform constant potential output or pulse output that is a noise source in a high impedance state.

According to the configuration and touch detection operation described above, the number of driven electrodes can be halved and the radiated electromagnetic noise can be halved compared to when a driving method is used in which all of the touch electrodes TE are synchronized and driven at once. Additionally, substantially, the entire touch detection area can be detected simultaneously and, due to the driven area being divided, decreases in the touch detection accuracy do not occur.

The pulse voltage is applied to the touch electrodes TE to be driven and the reference voltage Vc is applied to the touch electrodes TE not to be driven. As such, electromagnetic shielding effects of the touch electrodes TE and the drive signal lines SL can be obtained. Furthermore, parasitic capacitance is also generated between the touch electrodes TE in the constant voltage state when the finger 21 is approaching. As such, even when the finger 21 is in an electrically floating state and is unstable, it is possible to accurately determine whether there is the finger 21 and, when there is the finger 21, the position thereof.

Note that, although an example is given in which the finger 21 is detected, any object to be detected can be used provided that parasitic capacitance can be formed between the touch electrodes TE and the object to be detected. Examples thereof include a part of a living organism, a stylus pen, a touch pen, and the like. Note that the size and the grouping of the touch electrodes TE are set in accordance with the size of the object to be detected such that sensor electrodes of different groups are disposed within the size of the object to be detected.

Although an example is given in which the display mode DM and the touch detection mode TM are set in an alternating manner, the modes may be set in any manner.

Although an example is described in which the touch panel is a touch display device provided with a display function, the touch panel may be a touch panel dedicated to touch detection and that is not provided with a display function.

The driver IC may have any configuration provided that the position determination described above can be performed. For example, the driver IC may have a configuration to detect the distribution of the currents, and an external device may determine the distribution of the capacitance and the position of the finger.

Figure 6:
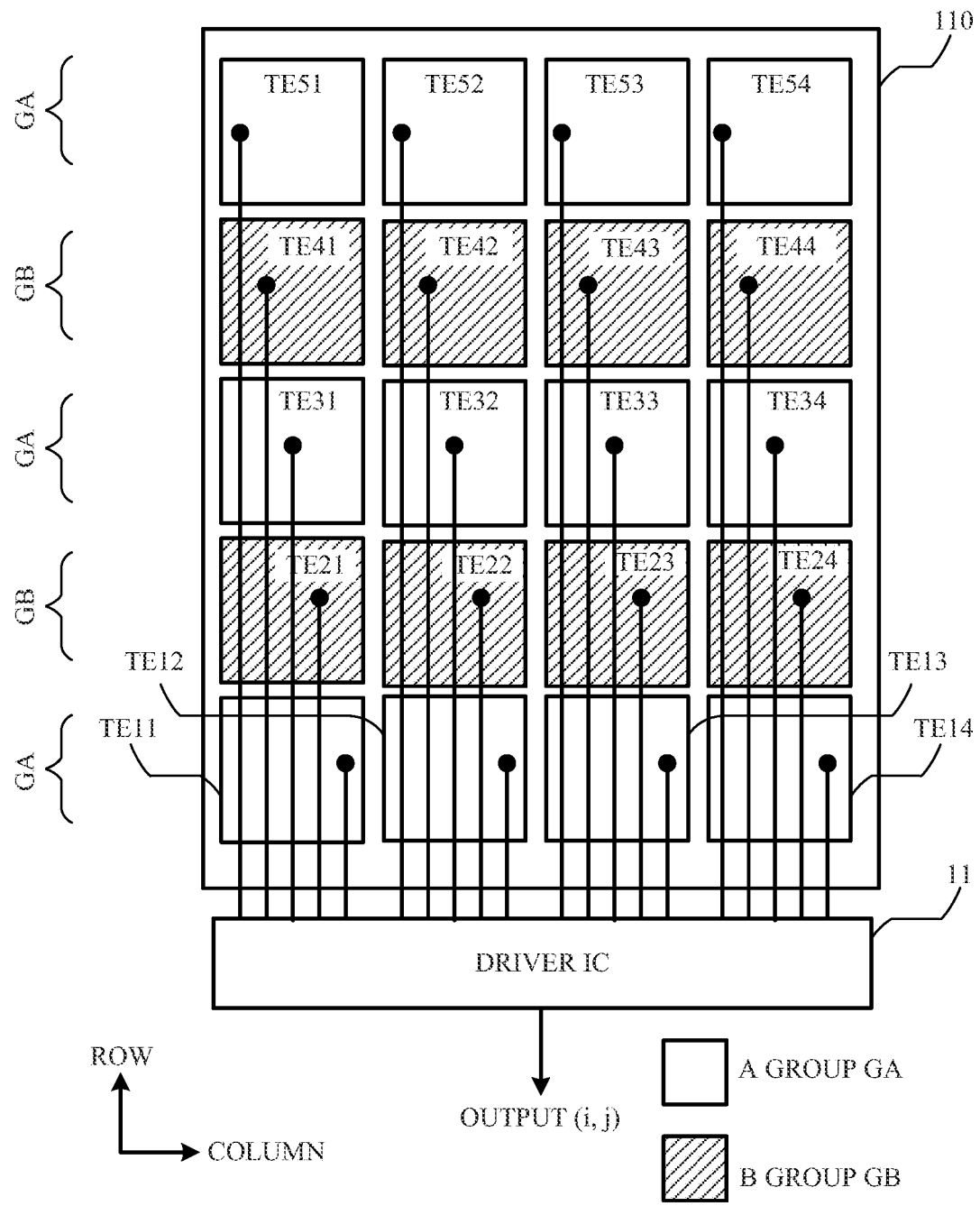
FIG. 6 is a configuration drawing of a first modified example of the touch detector according to Embodiment 1.

In the embodiment described above, the touch electrodes TE are grouped in a repeating pattern of single-row units. Due to this, the touch electrodes TE are grouped such that each of the plurality of sensor electrodes is adjacent to at least one sensor electrode that belongs to the other group. However, the present disclosure is not limited thereto. For example, a configuration is possible in which, as with a touch detector 121 illustrated in FIG. 6, the touch electrodes TE are grouped in a pattern that repeats every other row, and the drive pulse is applied in an alternating manner. The drive signals in such a case may be the same as those illustrated in FIGS. 4B and 4C. Note that, in FIG. 6, in order to facilitate understanding of the grouping of the touch electrodes TE, the touch electrodes TE of the same group are marked with the same hatching. The same is true for the following drawings as well.

Figure 7:
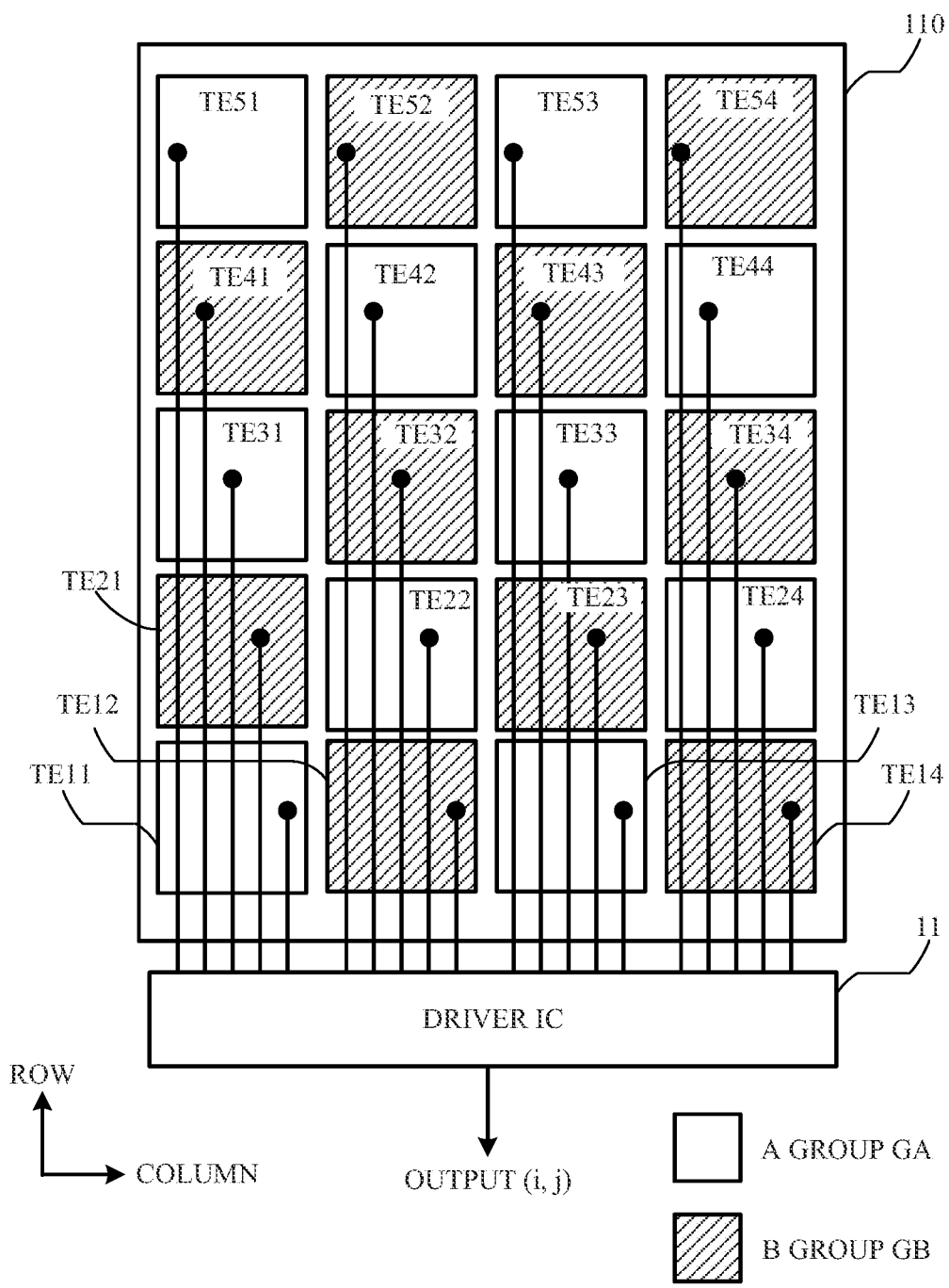
FIG. 7 is a configuration drawing of a second modified example of the touch detector according to Embodiment 1.

In the description given above, examples are given in which the touch electrodes TE are grouped in a repeating pattern of a plurality of detection units such as row units or column units. However, the present disclosure is not limited thereto. For example, a configuration is possible in which, as with a touch detector 122 illustrated in FIG. 7, the touch electrodes TE are grouped in a repeating pattern of single units, that is, are grouped in a checkered pattern, and the drive pulse is applied in an alternating manner. The drive signals in such a case may be the same as those illustrated in FIGS. 4B and 4C.

Embodiment 2

In the description given above, the examples are given in which the touch electrodes TE are divided into two groups, and the drive pulse is applied in an alternating manner. However, the present disclosure is not limited thereto. A configuration is possible in which the touch electrodes TE are divided into n groups, where n is any natural number greater than or equal to 2, and the drive pulse is applied sequentially by group unit. In the following, an example is described in which the number of groups n=3.

Figure 8:
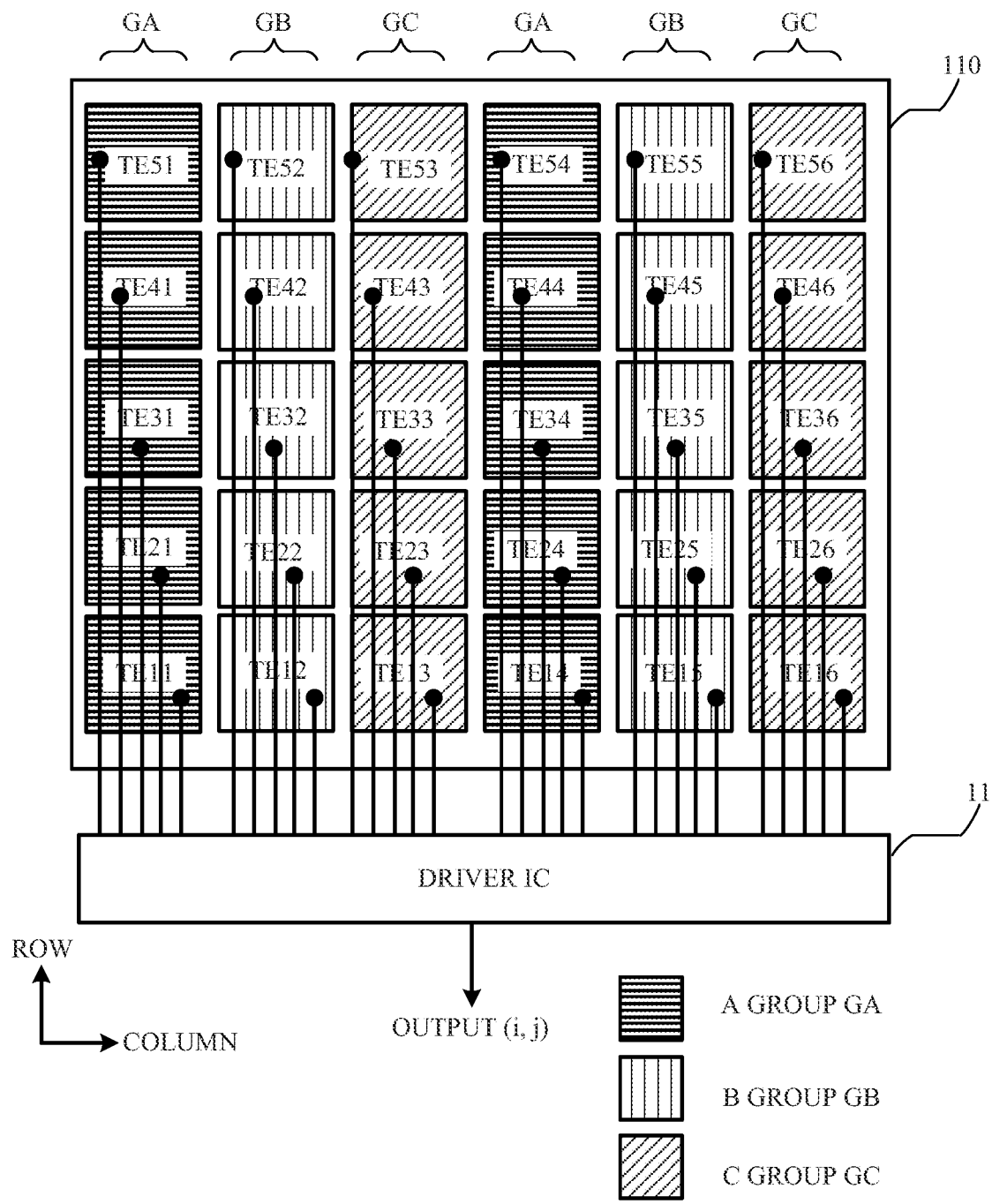
FIG. 8 is a configuration drawing of a first example of a touch detector according to Embodiment 2.

In a touch detector 123 of FIG. 8, an example is illustrated in which the touch electrodes TE are divided, in column units, into three groups, namely A group GA, B group GB, and C group GC. As illustrated in FIG. 8, the touch electrodes TE of the first and fourth columns are grouped into the A group GA, the touch electrodes TE of the second and fifth columns are grouped into the B group GB, and the touch electrodes TE of the third and sixth columns are grouped into the C group GC. In the case of such a configuration, the touch electrodes TE are arranged such that the touch electrodes TE belonging to the three groups GA, GB, and GC can exist in the range of the size of the object to be detected. In one example, when the width of the finger 21 is 5 mm, the touch electrodes TE are set such that the width of a touch electrode TE×3<5 mm.

Figure 9:
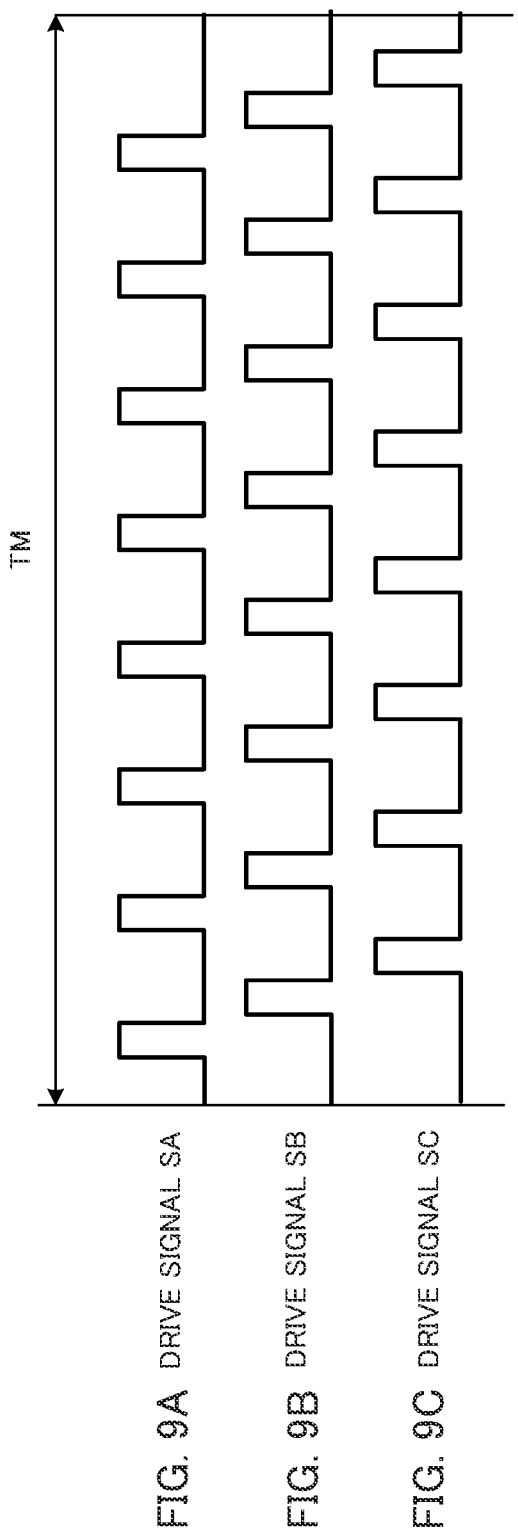
FIGS. 9A to 9C are timing charts explaining operations of the touch display device illustrated in FIG. 7.

As illustrated in FIGS. 9A to 9C, the driver IC 11 sequentially applies the drive pulse to the groups in the order of the touch electrodes TE of the A group GA→the touch electrodes TE of the B group GB→the touch electrodes TE of the C group GC . . . , and applies the reference voltage Vc to the non-driven touch electrodes TE. In other words, in one frame, all of the touch electrodes TE are driven in three applications of the drive pulses while switching the touch electrodes TE.

Figure 10:
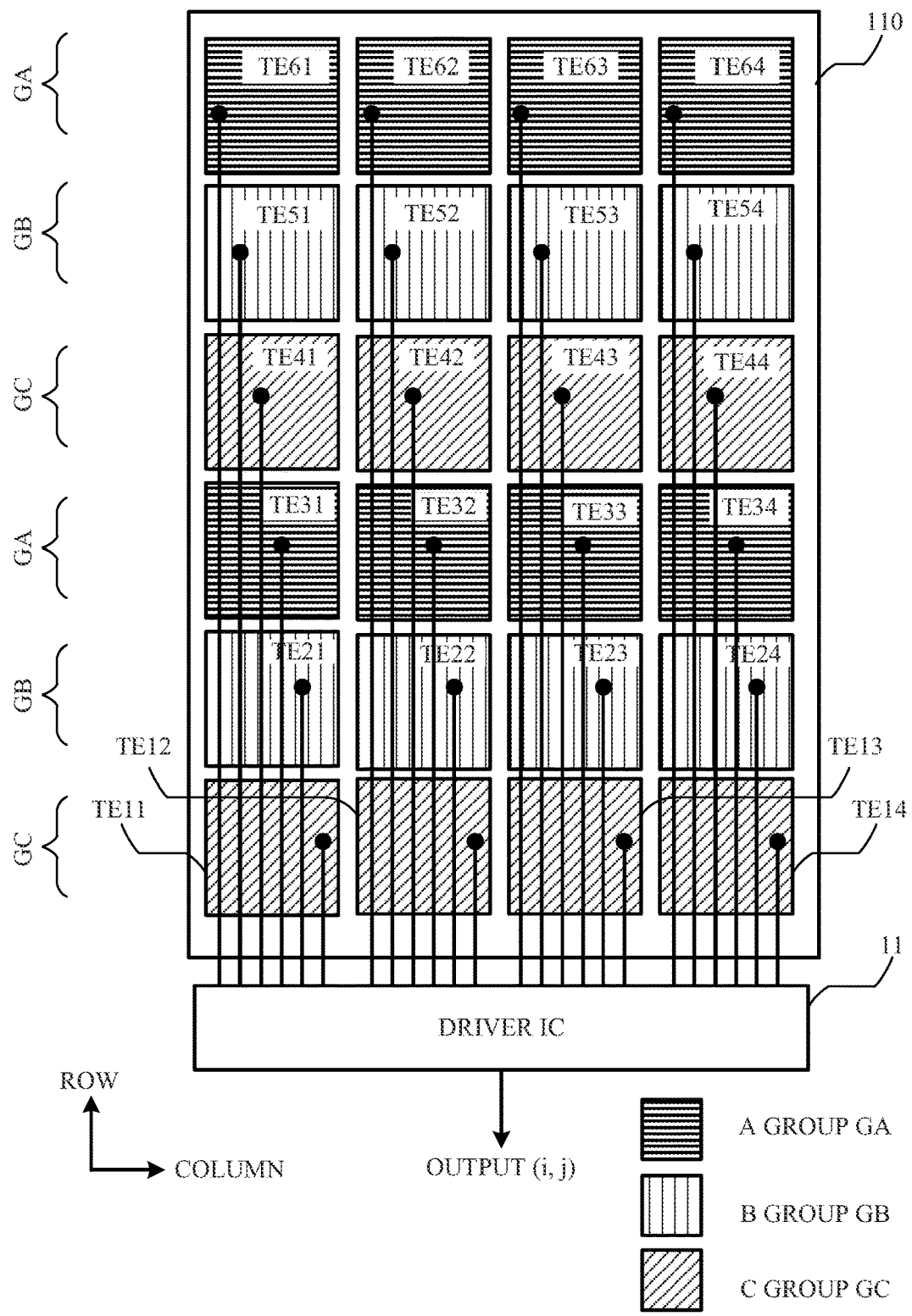
FIG. 10 is a configuration drawing of a second example of the touch detector according to Embodiment 2.

In a touch detector 124 of FIG. 10, an example is illustrated in which the touch electrodes TE are divided, in row units, into three groups, namely A group GA, B group GB, and C group GC. As illustrated in FIG. 10, the touch electrodes TE of the first and fourth rows are grouped into the A group GA, the touch electrodes TE of the second and fifth rows are grouped into the B group GB, and the touch electrodes TE of the third and sixth rows are grouped into the C group GC. As illustrated in FIGS. 9A to 9C, the driver IC 11 sequentially applies the drive pulse in the order of the touch electrodes TE of the A group GA→the touch electrodes TE of the B group GB→the touch electrodes TE of the C group GC . . . , and applies the reference voltage Vc to the non-driven touch electrodes TE.

Figure 11:
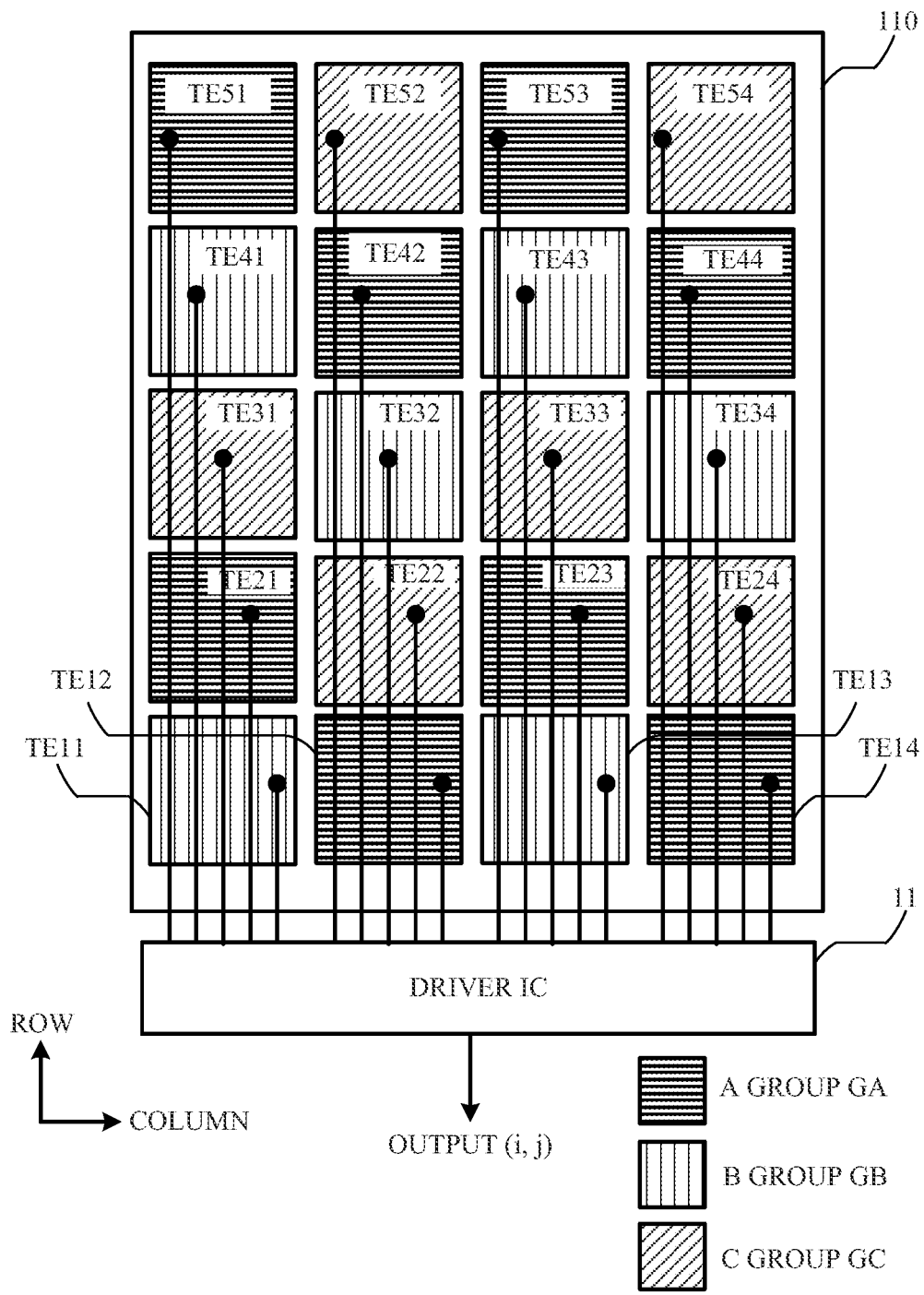
FIG. 11 is a configuration drawing of a third example of the touch detector according to Embodiment 2.

Furthermore, in a touch detector 125 of FIG. 11, an example is illustrated in which the touch electrodes TE are divided, in single units, into three groups, namely A group GA, B group GB, and C group GC. As illustrated in FIGS. 9A to 9C, the driver IC 11 sequentially applies the drive pulse in the order of the touch electrodes TE of the A group GA→the touch electrodes TE of the B group GB→the touch electrodes TE of the C group GC . . . , and applies the reference voltage Vc to the non-driven touch electrodes TE.

According to the configurations of Embodiment 2, it is possible to reduce the radiated electromagnetic noise greater than or equal to in Embodiment 1. Additionally, as in Embodiment 1, electromagnetic shielding effects can be obtained and a finger or the like in the floating state can be more accurately detected.

Embodiment 3

When the number of sensor electrodes TE is increased, there is a possibility that false detections will occur due to the effects of coupling between the sensor electrodes TE. In the present embodiment, in groupings of every n rows, every n columns, or every n unit squares, detection results of the touch electrodes TE adjacent to the touch electrodes TE of the other group are not used in the position detection, and only the detection results of the touch electrodes TE that are not adjacent are used to detect the object to be detected. As a result, the effects of coupling between the touch electrodes TE is reduced. Note that n≥3.

Figure 12:
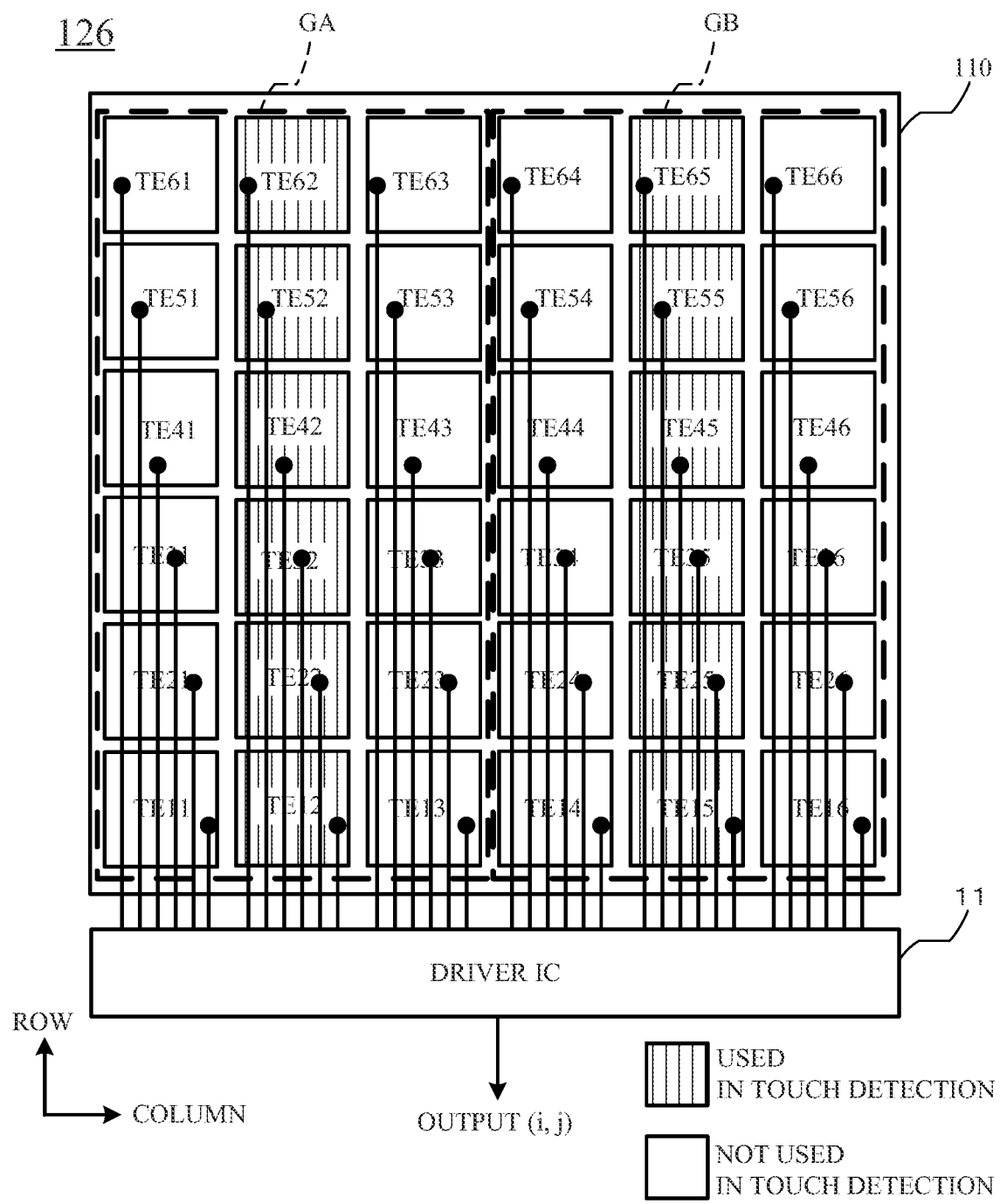
FIG. 12 is a configuration drawing of a first example of a touch detector according to Embodiment 3.

A touch detector 126 of FIG. 12 illustrates an example in which the touch electrodes TE are grouped as three-column units. Specifically, the touch electrodes TE of the first to third columns are grouped into A group GA, and the touch electrodes TE of the fourth to sixth columns are grouped into B group GB. Note that, in this example as well, it is desirable that the touch electrodes TE are set such that the width of one of the groups GA, GB<the size of the object to be detected.

The driver IC 11 applies, in parallel, the drive signal SA illustrated in FIG. 4B to the touch electrodes TE of the A group GA, that is, to the touch electrodes TE of the first to third columns, and applies, in parallel, the drive signal SB illustrated in FIG. 4C to the touch electrodes TE of the B group GB, that is, to the touch electrodes TE of the fourth to sixth columns.

To carry out the touch detection, the driver IC 11 uses the touch electrodes TE of each second column except for the outermost columns, of the groups GA, GB, that is, uses the touch electrodes TE of the second and fifth columns. The touch electrodes TE which are used for the touch detection are illustrated marked by hatching. More specifically, the driver IC 11 uses only the current flowing transiently to the touch electrodes TE of the second and fifth columns to detect the touch or approach and, although the driver IC 11 applies the drive signal SA or SB to the touch electrodes TE of the first, third, fourth, and sixth columns, does not detect the current flowing to these touch electrodes TE and does not use this current in the touch detection. In the following, the touch electrodes for which current is detected and that are used in the touch detection are referred to as active electrodes, and the touch electrodes to which the drive signal is applied but the current is not detected and are not used in the touch detection are referred to as inactive electrodes.

Next, a touch detection operation of the touch detector 126 is described. The driver IC 11 applies the drive signal SA illustrated in FIG. 4B to the touch electrodes TE of the A group GA, and applies the drive signal SB illustrated in FIG. 4C to the touch electrodes TE of the B group GB.

At the timing at which the driver IC 11 applies the drive pulse to the touch electrodes TE of the A group GA and applies the reference voltage Vc to the touch electrodes TE of the B group GB, the driver IC 11 detects the current flowing through each drive signal line SL connected to the touch electrodes TE of the second column, obtains the distribution of the current, that is, the distribution of the parasitic capacitance, and obtains the position coordinates (i, j) of the finger from the obtained distribution.

Then, at the timing at which the driver IC 11 applies the reference voltage Vc to the touch electrodes TE of the A group GA and applies the drive pulse to the touch electrodes TE of the B group GB, the driver IC 11 detects the current flowing through each drive signal line SL connected to the touch electrodes TE of the fifth column, obtains the distribution of the current, that is, the distribution of the parasitic capacitance, and obtains the position coordinates (i, j) of the finger from the obtained distribution.

While in the touch detection mode, the driver IC 11 repeats the same operation.

Figure 13:
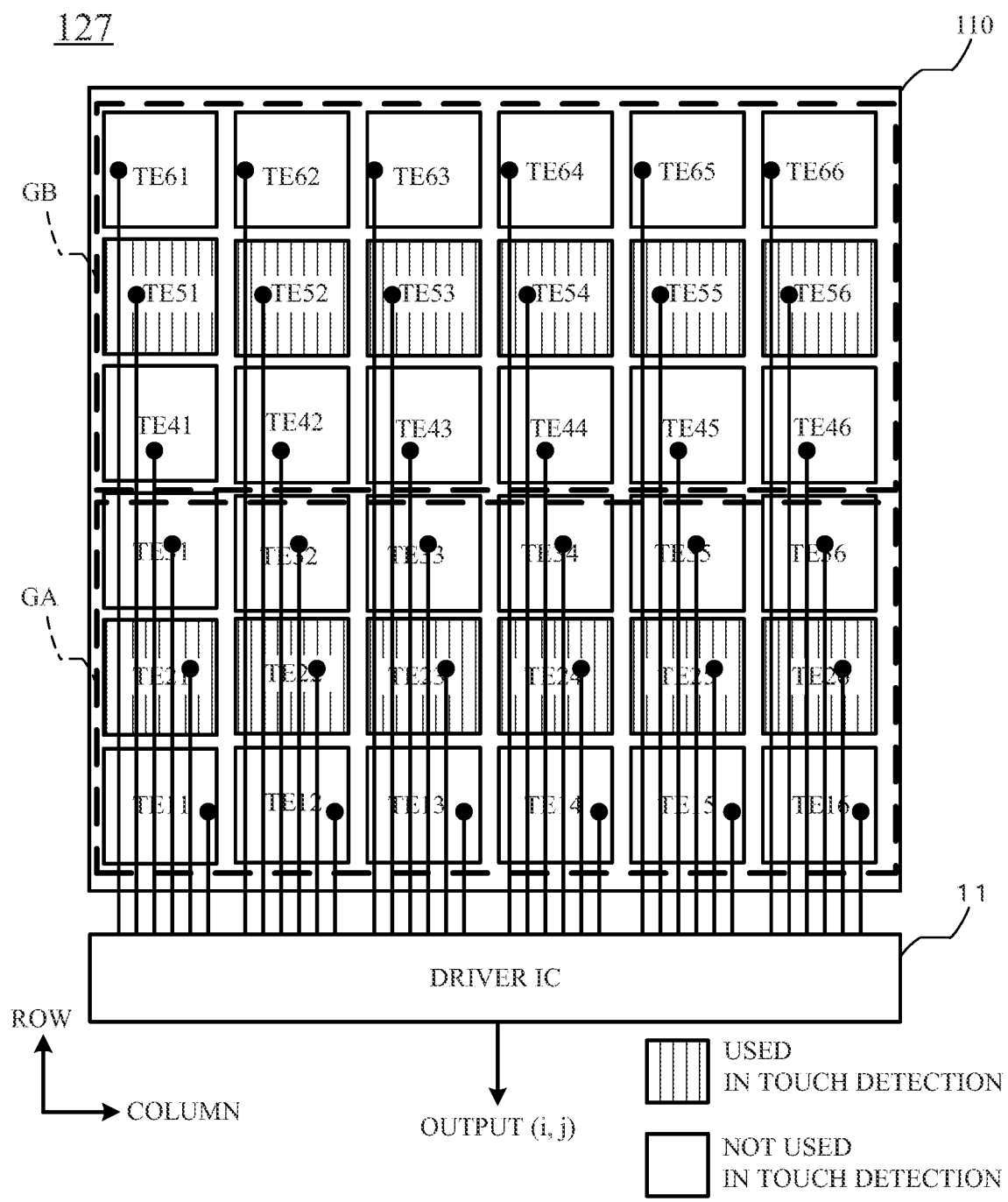
FIG. 13 is a configuration drawing of a second example of the touch detector according to Embodiment 3.

A touch detector 127 of FIG. 13 illustrates an example in which the touch electrodes TE are grouped as three-row units. Specifically, the touch electrodes TE of the first to third rows are grouped into A group GA, and the touch electrodes TE of the fourth to sixth rows are grouped into B group GB. Note that, in this example as well, it is desirable that the touch electrodes TE are set such that the width of one of the groups GA, GB<the size of the object to be detected.

The driver IC 11 applies, in parallel, the drive signal SA illustrated in FIG. 4B to the touch electrodes TE of the A group GA, and applies, in parallel, the drive signal SB illustrated in FIG. 4C to the touch electrodes TE of the B group GB.

The driver IC 11 sets only the touch electrodes TE of the second and fifth rows through which current flows transiently as the active electrodes that are used in the detection of the touch or approach, and sets the touch electrodes TE of the first, third, fourth, and sixth rows as the inactive electrodes that are not used in the touch detection.

Figure 14:
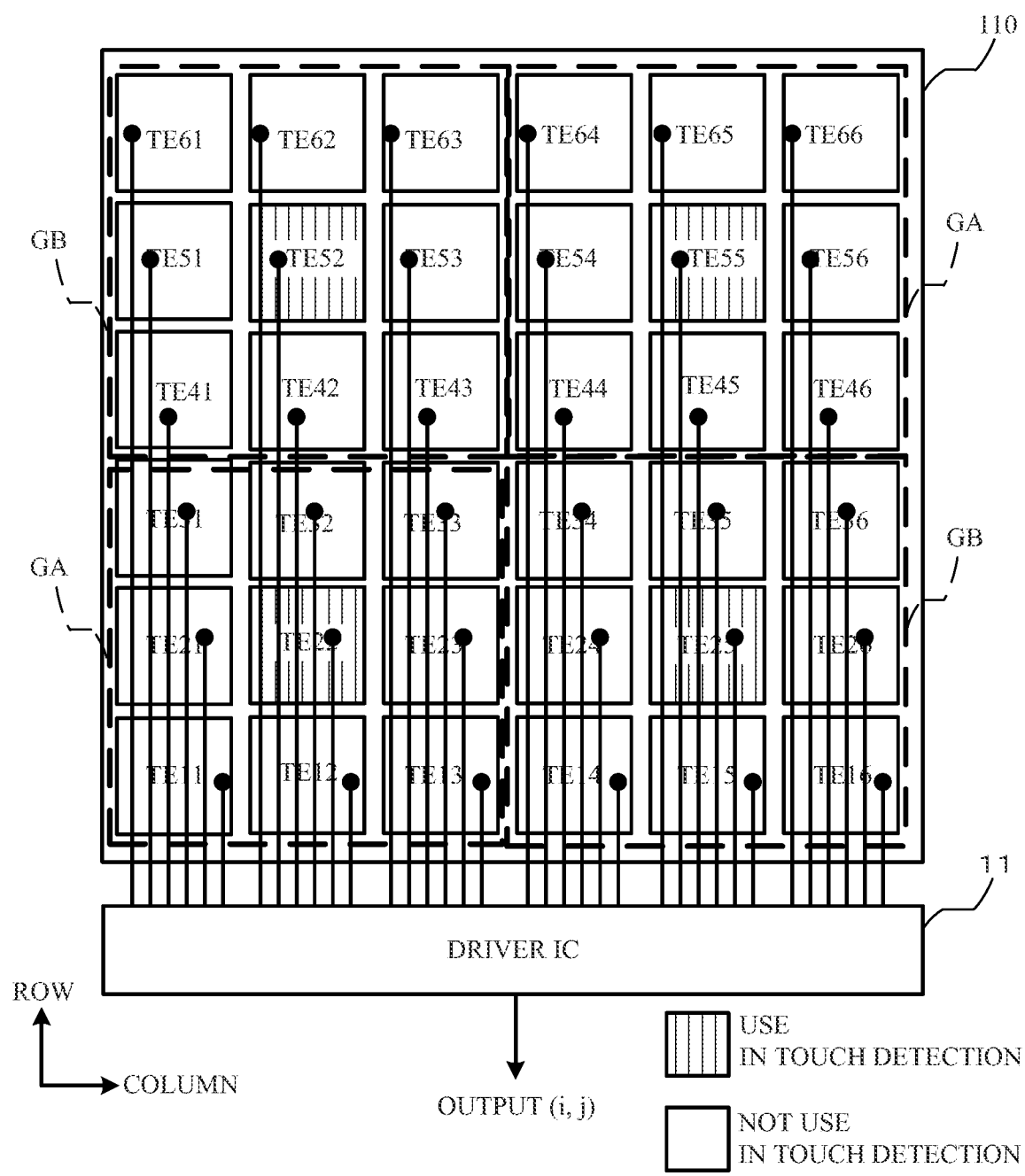
FIG. 14 is a configuration drawing of a third example of the touch detector according to Embodiment 3.

In a touch detector 128 of FIG. 14, each unit of the touch electrodes TE is configured from nine touch electrodes TE arranged in three columns and three rows. The plurality of units is divided into a group GA and a group GB such that adjacent units belong to different groups. Of the three columns and three rows of touch electrodes TE constituting a unit, the touch electrode TE in the center is set as the active electrode that is used in the touch detection, and the eight surrounding touch electrodes TE are set as the inactive electrodes. The driver IC 11 applies, in parallel, the drive signal SA illustrated in FIG. 4B to the touch electrodes TE of the group GA, and applies, in parallel, drive signal SB illustrated in FIG. 4C to the touch electrodes TE the group GB.

At the timing at which the driver IC 11 applies the drive pulse to the touch electrodes TE of the group GA and applies the reference voltage Vc to the touch electrodes TE of the group GB, the driver IC 11 detects the touch electrode TE at the center of each unit, that is, detects the current flowing through each drive signal line SL connected to the touch electrodes TE22 and TE55, obtains the distribution of the current, that is, the distribution of the parasitic capacitance, and obtains the position coordinates (i, j) of the finger. Then, at the timing at which the driver IC 11 applies the drive pulse to the touch electrodes TE of the group GB and applies the reference voltage Vc to the touch electrodes TE of the group GA, the driver IC 11 detects the touch electrode TE at the center of each unit, that is, detects the current flowing through each drive signal line SL connected to the touch electrodes TE52 and TE25, and obtains the position coordinates (i, j) of the finger. The driver IC 11 thereafter repeats the same operations while in the touch detection mode TM, and outputs the ultimate detected position.

According to the touch detector of Embodiment 3, the effects of coupling between the touch electrodes TE can be reduced, and the detection accuracy can be enhanced. Note that a configuration is possible in which n is 4 or greater. In such a case, coordinate detection is carried out with the touch electrodes TE that are not adjacent to the touch electrodes TE of the other units as the active electrodes, and the touch electrodes TE that are adjacent to the touch electrodes TE of the other units as the inactive electrodes.

Embodiment 4

When the number of groupings is great, the number of the touch electrodes TE that are simultaneously driven decreases, and the radiated electromagnetic noise decreases. However, since the touch electrodes TE must be switched to be driven, the detection time increases. The display blank period differs depending on the video signal that is input and, as such, the number of groupings may be switched to obtain a touch detection period that corresponds to that video signal.

Figure 15:
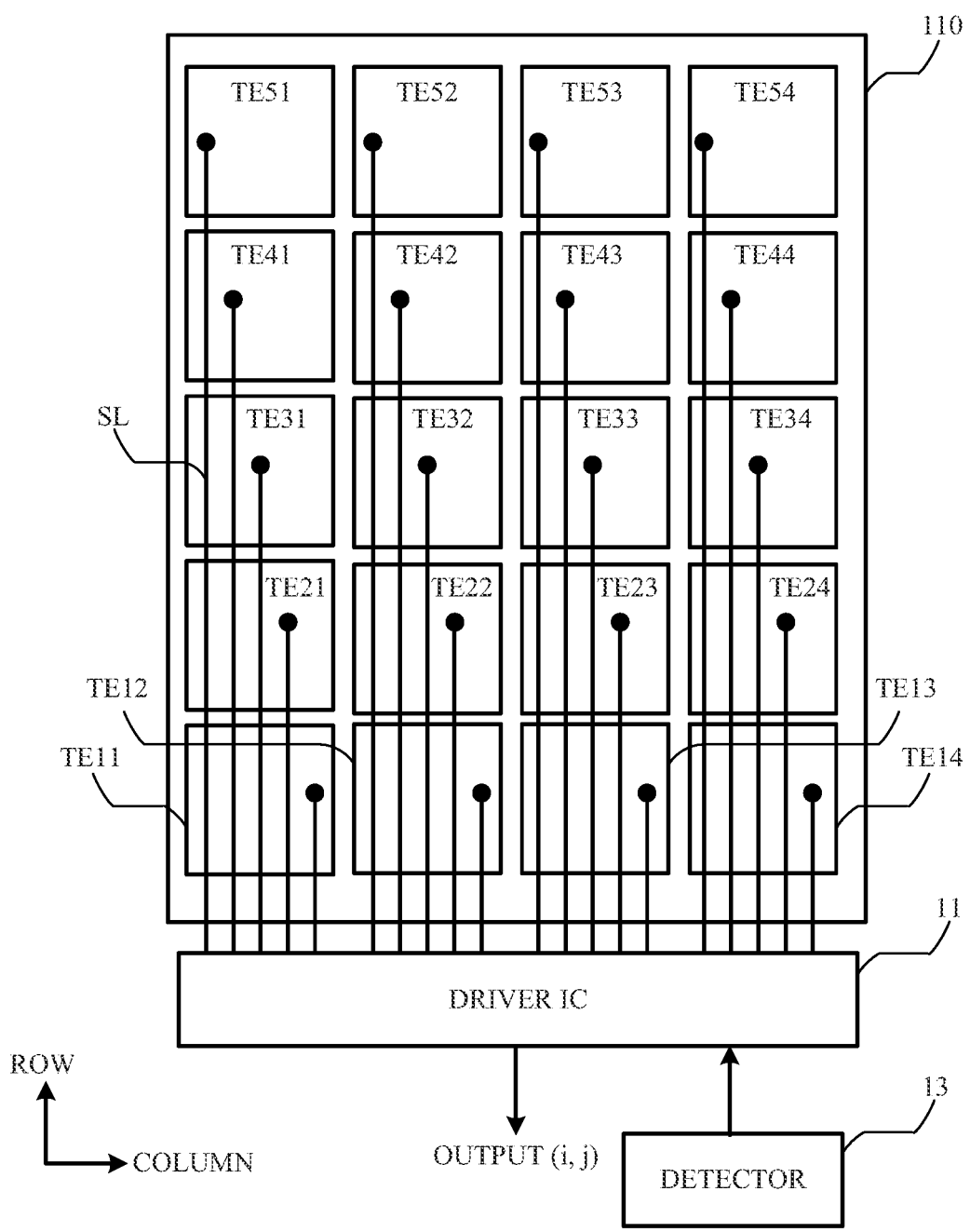
FIG. 15 is a configuration drawing of a touch detector according to Embodiment 4.

For example, in a touch detector 129 of FIG. 15, a detector 13 such as a noise detector or an operating mode detector is connected to the driver IC 11. A configuration is possible in which, when the detector 13 detects electromagnetic noise of a magnitude that is greater than or equal to a reference and/or in the case of a predetermined operating mode in which electromagnetic noise is likely to be generated, in order to suppress the generation of electromagnetic noise, the detector 13 divides the touch electrodes TE into N groups and separately drives the touch electrodes TE, for example; and when the detector 13 detects electromagnetic noise of a magnitude that is less than the reference and/or in the case of a predetermined operating mode in which electromagnetic noise is not likely to be generated, the detector 13 outputs a control signal to the driver IC 11 that reduces the number of divisions N so as to allow an increase in electromagnetic noise.

A configuration is possible in which, when a touch is not detected for a reference period or longer, the driver IC 11 increases the number of divisions N to suppress noise. In such a case, it is sufficient that the driver IC 11 includes a timer, for example, resets the timer when a touch is detected and, when the timer counts a reference value, switches the number of divisions N.

Any grouping of the touch electrodes TE can be used provided that electrodes belonging to different groups are included in a range smaller than the object to be detected, such as a finger. For example, any combination of Embodiments 1 to 4 may be used, a configuration in which three or more groupings are provided is possible, and a configuration in which the number of divisions N is three or greater is possible. Such configurations enable grouping to be performed that corresponds to the operating environment. When, for example, the touch panel is incorporated into a device A, a configuration is possible in which, in a case in which the grouping illustrated in FIG. 2 is undesirable for various reasons, the detector 13 detects that the touch panel is incorporated into the device A and outputs a control signal, and the driver IC 11 uses the grouping method illustrated in FIG. 15 instead of the grouping method illustrated in FIG. 2. Additionally, a configuration is possible in which, when parasitic capacitance exists on the drive signal lines SL and the touch electrodes TE, the grouping method is selected on the basis of the parasitic capacitance detected by the detector 13 so as to reduce the effects of the parasitic capacitance. Additionally, a configuration is possible in which a control signal is supplied to the driver IC 11 on the basis of a user command.

Figure 16:
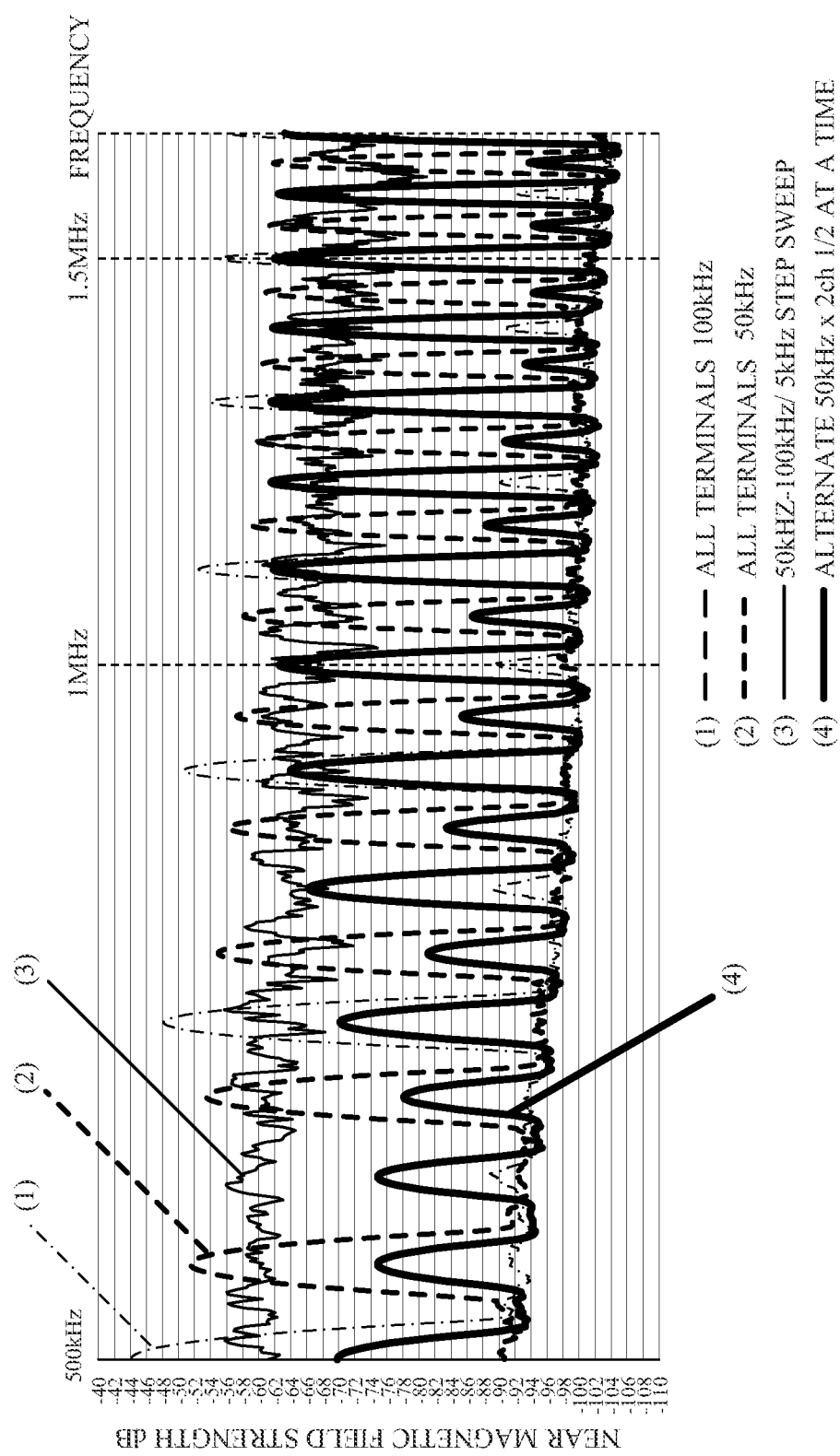
FIG. 16 is a drawing illustrating, by driving method, a spectral distribution of a near magnetic field when pulse drives touch electrodes.

FIG. 16 illustrates the results of measuring a near magnetic field of a touch panel surface when pulse driving the touch electrodes. By measuring the near magnetic field of the touch panel, the magnitude of the spike current flowing through the touch panel and the frequency component thereof can be confirmed. Magnetic field strength is illustrated on the vertical axis in terms of dB, and frequency Hz is illustrated on the horizontal axis. (1) and (2) assume typical touch panel driving conditions. (1) is a case in which all of the touch electrodes are driven by a 100 kHz pulse signal, and (2) is a case in which all of the touch electrodes are driven by a 50 kHz pulse signal. (3) assumes touch panel driving conditions in which the driving frequency is variable, and the frequency of the pulse signal is changed from 50 kHz to 100 kHz in 5 kHz steps. (4) simply imitates the touch panel driving conditions of the present disclosure (for example, the TM period of FIG. 3), and illustrates a case in which a 50 kHz pulse signal is applied to half of the touch panel electrodes and constant potential is applied to the other half, and the driving state of each half of the touch electrodes alternates.

In the measurement results (4) illustrated in FIG. 16, the magnetic field strength at frequencies lower than 1 MHz is lower than in the other measurement results. Even at frequency bands higher than 1 MHz, the magnetic field strength is less than or equal to the measurement results obtained using the other driving methods, and worsening is not observed. Therefore, it is confirmed that the driving method for a touch panel of the present disclosure can suppress spike current that flows through the touch panel, and can control the frequency component of the spike current waveform. In other words, the embodiments of the present disclosure provide a touch panel and a control method for the touch panel that are capable of suppressing electromagnetic noise that radiates from the touch panel and controlling the frequency of the electromagnetic noise.

Embodiments of the present disclosure are described above, but the present disclosure is not limited by the embodiments.

In the embodiments described above, a description is given in which the current flowing transiently through a touch electrode TE to which the drive pulse is applied is detected to detect the capacitance of that touch electrode TE and, thereby, detect the object to be detected. However, a method other than detecting current may be used. For example, a configuration is possible in which any physical quantity that varies depending on the magnitude of the capacitance formed between the object to be detected and the touch electrode TE, such as an amount of charged stored in the touch electrode and detection of the capacitance of the touch electrode TE, is set as the detection target.

In the embodiments described above, the reference voltage Vc is applied to the non-driven electrodes TE, but a configuration is possible in which the non-driven electrodes are set to a floating state or AC voltage is applied to the non-driven electrodes. However, a fixed DC reference voltage is desirable.

For example, a configuration is possible in which the touch detection device does not include a display function. Additionally, the grouping of the touch electrodes is not limited to the examples described above. That is, any grouping method may be used, provided that the touch electrodes TE arranged in the region to be detected can be grouped such that each of the touch electrodes TE is adjacent to at least one electrode TE belonging to another group.

In the embodiments described above, the driver IC 11 performs the detection of whether there is a touch and the detection of the touch position. However, a configuration is possible in which the driver IC 11 transmits the capacitance distribution detected in each detection process to a host device, and the host device is responsible for identifying whether there is a touch and, when there is a touch, the touch position. The division of roles between the driver IC 11 and the host device can be set as desired.

In the embodiments described above, in the touch detection mode TM, the number of drive pulses applied to the touch electrodes TE of each group is set to eight, but the number of pulses can be set as desired. However, from the perspective of detection accuracy, it is preferable that the number of pulses be set to five or more. Additionally, the pulse width, the duty of the pulse, and the like can be set as desired. Moreover, it is sufficient that the voltage of the drive pulse (pulse height) be appropriately set in a range in which touches can be detected and, also, electromagnetic noise can be suppressed. A positive pulse is described for the drive pulse, but the polarity of the drive pulse can be set as desired. The driver IC may be implemented as a semiconductor device, a discrete circuit, or as a processor controlled by software.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. A touch panel, comprising:
   arranged sensor electrodes; and
   a driver circuit connected to each of the sensor electrodes, wherein
   the sensor electrodes are grouped into a plurality of groups such that electrodes belonging to different groups are included in a range smaller than an object to be detected, and
   the driver circuit alternately or sequentially applies a driving voltage to the sensor electrodes of the plurality of groups, detects a capacitance of each of the sensor electrodes in a state in which the electrodes belonging to different groups are included in the range smaller than the object to be detected, and detects, based on the detected capacitance, whether there is a touch.

2. The touch panel according to claim 1, wherein the driver circuit applies a reference voltage to the sensor electrodes of the groups to which the driving voltage is not applied.

3. The touch panel according to claim 1, wherein
   the sensor electrodes are arranged in a matrix and are each grouped so as to be adjacent to at least one of the sensor electrodes belonging to another group, and
   the driver circuit alternately or sequentially applies the driving voltage to the sensor electrodes of the plurality of groups.

4. The touch panel according to claim 1, wherein the sensor electrodes are alternately grouped into one or another of two groups in a column unit, a row unit, or individually.

5. The touch panel according to claim 1, wherein
   the sensor electrodes are arranged in a matrix and are grouped into three groups such that every other sensor electrode belongs to a different group, and
   the driver circuit applies the driving voltage to the sensor electrodes in order by group unit.

6. The touch panel according to claim 5, wherein the sensor electrodes are grouped in order in any of three groups in a row unit, a column unit, or individually.

7. The touch panel according to claim 1, wherein
the sensor electrodes are arranged in a matrix,
one unit is constituted by a plurality of the sensor electrodes, grouping is performed such that adjacent units belong to different groups, and
based on a capacitance of a sensor electrode, of the sensor electrodes of each unit, that is not adjacent to another unit, the driver circuit detects whether there is a touch.

8. The touch panel according to claim 7, wherein the sensor electrodes form the unit in a three-column unit, a three-row unit, or a three column by three row unit.

9. The touch panel according to claim 1, wherein the driver circuit switches grouping of the plurality of sensor electrodes.

10. The touch panel according to claim 9, wherein the driver circuit switches the grouping in any of when a control signal commands, when a touch is not detected for a reference period, when an operating mode of an electronic device provided with the touch panel is in a specific operating mode, and when radiated electromagnetic noise of the touch panel is greater than or equal to a reference.

11. A driving method for a touch panel that includes arranged sensor electrodes, the driving method comprising:
grouping the sensor electrodes into a plurality of groups such that electrodes belonging to different groups are included in a range smaller than an object to be detected; and
applying a driving voltage to the sensor electrodes in a group order, detecting a capacitance of each of the sensor electrodes in a state in which the electrodes belonging to different groups are included in the range smaller than the object to be detected, and detecting, based on the detected capacitance, whether there is a touch.

* * * * *